United States Patent
Na et al.

(10) Patent No.: US 7,421,416 B2
(45) Date of Patent: Sep. 2, 2008

(54) METHOD OF MANAGING WEB SITES REGISTERED IN SEARCH ENGINE AND A SYSTEM THEREOF

(75) Inventors: Sun Kyoon Na, Seoul (KR); Hyun Jung Lee, Seoul (KR); Ki Jeong Choi, Seoul (KR)

(73) Assignee: NHN Corporation, Seoul (KR)

( * ) Notice: Subject to any disclaimer, the term of this patent is extended or adjusted under 35 U.S.C. 154(b) by 537 days.

(21) Appl. No.: 10/551,752

(22) PCT Filed: Mar. 25, 2004

(86) PCT No.: PCT/KR2004/000664

§ 371 (c)(1), (2), (4) Date: Sep. 30, 2005

(87) PCT Pub. No.: WO2004/088541

PCT Pub. Date: Oct. 14, 2004

(65) Prior Publication Data

US 2006/0218168 A1    Sep. 28, 2006

(30) Foreign Application Priority Data

Apr. 4, 2003    (KR) ................... 10-2003-0021482

(51) Int. Cl.
*G06N 5/00* (2006.01)

(52) U.S. Cl. .......................... 706/20; 706/45

(58) Field of Classification Search ................ 706/20; 235/492
See application file for complete search history.

(56) References Cited

U.S. PATENT DOCUMENTS 6,607,136 B1 *    8/2003    Atsmon et al. ............ 235/492

FOREIGN PATENT DOCUMENTS

| KR | 1999025595 A | 4/1999 |
| KR | 2001025209 A | 4/2001 |
| KR | 2002081774 A | 10/2002 |

* cited by examiner

*Primary Examiner*—Wilbert L Starks, Jr.
(74) *Attorney, Agent, or Firm*—Ladas & Parry LLP (57) ABSTRACT

Disclosed is a method and system for managing web sites registered in a search engine that provides information about web sites on the Internet, wherein information about the web sites registered in the search engine is analyzed to prevent the provision of search results different from essential contents contained in the web sites. In the method, information of the registered web site is received and recorded in a database after being classified by predetermined fields. A search robot is controlled to read a source file constituting a web page of the registered web site, and the read source file is then analyzed. It is determined based on a predetermined basis whether or not the registered web site is a deceptive site. Predetermined processing is performed on the registered web site if the web site is determined to be a deceptive site. The source file is preferably an HTML document.

21 Claims, 10 Drawing Sheets

Directory Search (205 web results)

☐ FIFA World Cup    2002 FIFA Korea-Japan World Cup    History of the World Cup    World Cup Stadium    : Second Round Teams ☐ Civic Movement    Sponsor, Corporate Sponsor    Soccer Player    Fan Page    News & Media Web : Sort by ▼ | Popularity ▼ |
site         Relevance              Date ▶

1. 2002 FIFA World Cup Music
   http://fifaworldcup.yahoo.com/kr/e/om/

2. 2002 FIFA Korea/Japan World CupTM
   http://www.fifaworldcup.com/

3. Korean Organizing Committee for 2002 FIFA World Cup
   http://www.2002worldcupkorea.org/

FIG. 4c spam6.html

<title>Starcraft Zolaman Starcraft
Zolaman Starcraft Zolaman Starcraft
Zolaman Starcraft Zolaman Starcraft
Zolaman Starcraft Zolaman Starcraft
Zolaman Starcraft Zolaman Starcraft
Zolaman Starcraft Zolaman Starcraft
Zolaman Starcraft Zolaman</title>

View Source spam7.html

<title>Title</title>
<title>Hiddink Starcraft Zolaman </title>
<title>Hiddink Starcraft Zolaman </title>
<title>Hiddink Starcraft Zolaman </title>
<title>Hiddink Starcraft Zolaman </title>
<title>Hiddink Starcraft Zolaman </title>

View Source

FIG. 4d spam8.html

<META NAME="Description"
CONTENT=" Starcraft Zolaman Starcraft
Zolaman Starcraft Zolaman Starcraft
Zolaman Starcraft Zolaman Starcraft
Zolaman Starcraft Zolaman Starcraft
Zolaman ">

View Source

```
<a href="a11.htm">sex</a><a href="a12.htm>fetish video</a><a
href="a13.htm>fetish video</a><a href="a14.htm">sex</a><a
href="a14.htm">fetish video</a><a href="a14.htm">sex</a><a
href="a14.htm">sex</a><a href="a14.htm">fetish video</a><a
href="a14.htm">fetish video</a>
```

METHOD OF MANAGING WEB SITES REGISTERED IN SEARCH ENGINE AND A SYSTEM THEREOF

TECHNICAL FIELD

The present invention relates to a search engine for providing information about web sites on the Internet, and more particularly to a method for managing web sites registered in a search engine, wherein information about the web sites registered in the search engine is analyzed to prevent the provision of search results different from essential contents contained in the web sites.

BACKGROUND ART

A conventional search engine, such as Altavista (http://www.altavista.com), Lycos (http://www.lycos.com) or Yahoo (http://www.yahoo.com), generally includes a database for classifying, storing and managing web site information based on a predetermined rule, a search robot, embodied as software, for constantly traveling over the web and automatically collecting new web site information, and search engine software for storing the collected data in a database and allowing a user of the search engine to search for desired information in the database.

Figure 1A:
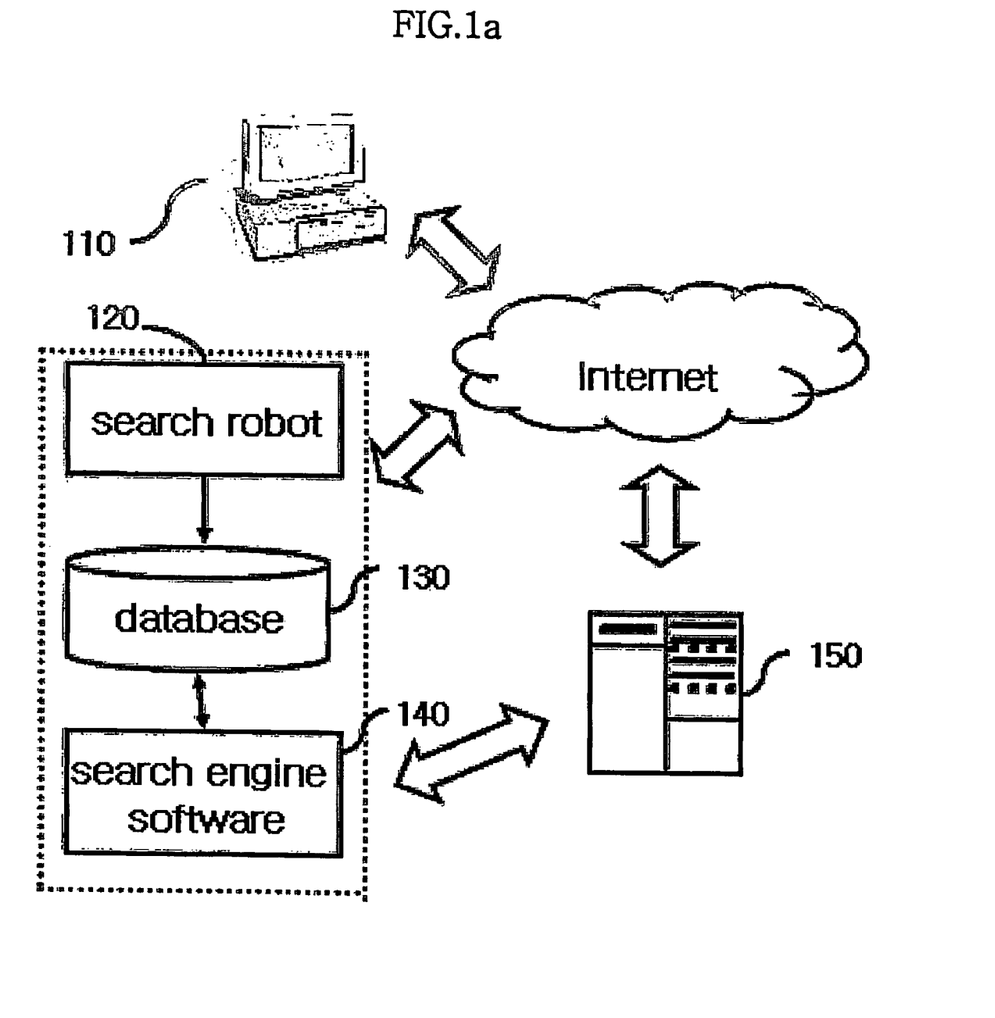
FIG. 1a is a block diagram showing the configuration of a conventional system for providing web site search engine services.

FIG. 1a is a block diagram showing an entire system for providing the search engine service. As shown in FIG. 1a, a user connects to a search engine server 150 over the Internet via a user terminal 110. If the user enters search terms, a search engine server 150 queries search engine software 140 about web site information corresponding to the entered search terms, and the search engine software 140 searches a database 130 to notify the user of retrieved web site information. A search robot 120 is an entity embodied as software for constantly traveling over the web and automatically collecting new web site information from a web server 160, as described above. The search robot 120 searches for HTML (Hypertext Markup Language) documents on a network and parses links described in the HTML documents and then collects data from a number of web sites existing on the network. The data collected by the search robot 120 is databased. The term "databased" refers to a series of processes of performing morphological analysis of information located on a web site and producing a corresponding index table and storing it in the database 130. The database 130 is provided to store all web site information collected by the search robot 120. The search engine software 140 functions to show search results to users. This software searches a large number of pages stored in the database 130 and lists search results by relevance to the search term. The conventional search engine as described above registers information about a web site in a search engine and provides the information to users in the following ways.

(1) Information of a web site is collected using the search robot as described above, and the web site information is registered in the search engine after being reviewed by expert surfers.

(2) A category corresponding to the subject of a web site to be registered is selected from a directory of categories classified by subject, and it is requested that the web site be registered in the selected category, and then the web site is registered in the search engine after being reviewed by expert surfers. Some search engines provide a fee-based directory registration service to reduce the time required to register a web site in their directory with a registration fee.

Figure 1B:
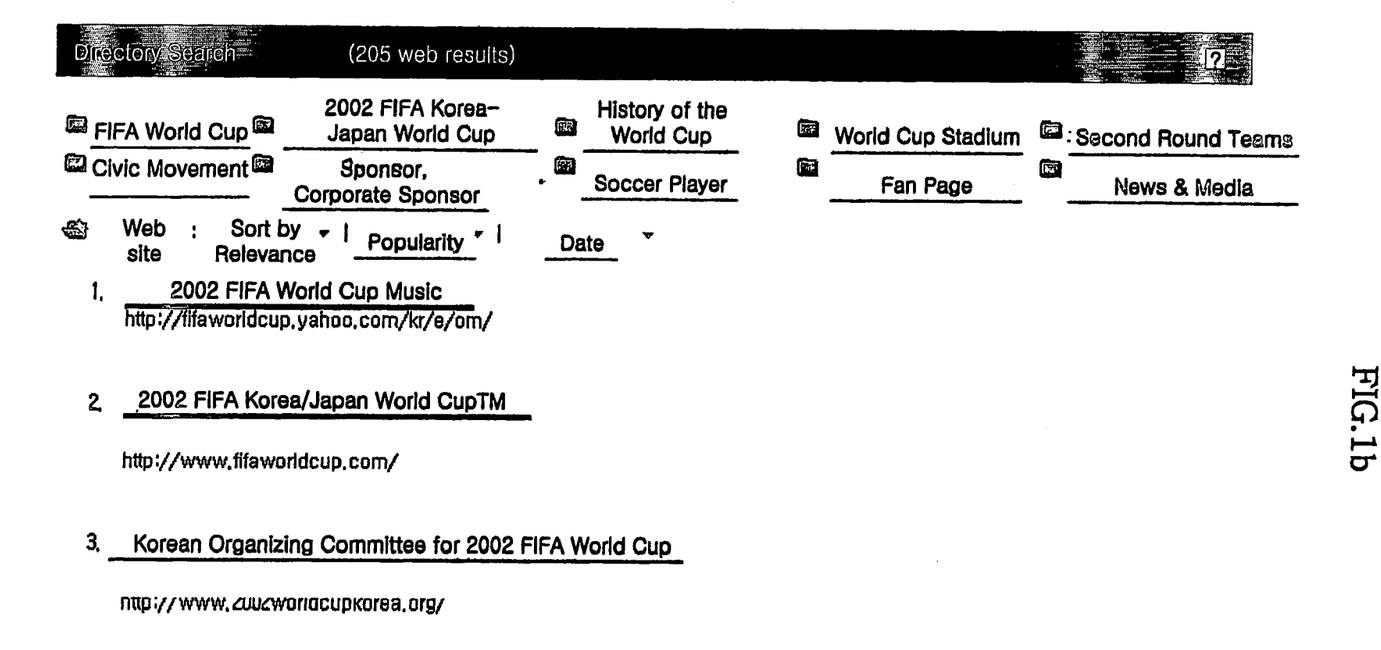
FIG. 1b is an example screenshot of a directory search method that is one of the web site search methods provided by search engines.

Web sites registered in the search engine in the above method are provided to a user who is looking for desired information after they are searched for in various ways, such as integrated web search and directory search, based on search terms entered by the user. The integrated web search is also called "word-based search", in which Universal Resource Locators (URLs) of all web sites are stored in a database and desired information is searched for based on a specific keyword entered by the user. The directory search is also called "subject-based search", in which web sites are organized into subject-based categories and if a user links to a desired category, the user can view detailed items thereof. In this manner, the subject-based search allows the user to continue to link to the detailed items and retrieve desired information. For example, if a user desires to find Korean team match scores in the 2002 Korea-Japan World Cup, the user can search for them via categories such as Sports→Ball Sports→Soccer→FIFA World Cup→2002 Korea-Japan World Cup→Korean team match scores. FIG. 1b is an example screenshot of the directory search method. As shown in this figure, directory search results with search terms "world cup" are three categories "World Cup", "2002 FIFA Korea-Japan World Cup" and "History of the World Cup", and the user can search for desired information by moving to one of the three categories in which the desired information is most likely to be placed. A typical search engine based on the integrated web search method is Lycos (http://lycos.cs.cm-u.edu) developed by Michael L. Mauldin at Carnegie-Mellon University, and a typical search engine based on the directory search method is Yahoo (http://www.yahoo.com). Many current search engines provide hybrid search services based on a combination of the different search methods described above.

The conventional method for registering web sites in the search engine and searching for the registered web sites has the following problems.

As the number of Internet users has rapidly increased, the number of users who desire to search for specific information has rapidly increased and the number of types of information for which they desire to search has increased. As the number of such users and the types of such information has increased, some search terms appear very frequently, which will also be referred to as "popular keywords". This causes a problem in that users, who desire to search for information based on the popular keywords, may receive information of web sites (hereinafter also referred to as "deceptive sites") that contain contents of no use to the users and insert the popular keywords in their web pages in various ways. For example, if a user enters a popular keyword "Pikachu" to search for information about the Pikachu, information of all registered web sites that contain the word "Pikachu" in their web pages is provided to the user. The web sites provided to the user may include web sites that contain adult or sexual contents and insert the word "Pikachu" in some places in their web pages in various ways (with ill intention in most cases). This popular keyword insertion causes a wide age range of users to be exposed to the information of the web sites that contain adult or sexual contents.

The conventional method for overcoming the problems described above requires complaint reports by users or requires specialists such as expert surfers to constantly monitor the registered web sites, but the conventional method obviously cannot be an ultimate solution to the problems. If an algorithm automatically executed on the Internet to solve the problems can be provided, it will be a useful means to solve the problems all at once.

DISCLOSURE OF THE INVENTION

Therefore, the present invention has been made in view of the above problems, and it is an object of the present invention to provide a method for managing web sites registered in a search engine, in which an algorithm is used to automatically detect deceptive sites, thereby allowing users of the search engine to correctly search for their desired information.

It is another object of the present invention to provide a method for managing web sites registered in a search engine, in which deceptive sites are automatically detected, and punitive measures are automatically imposed on operators of the detected deceptive sites, thereby reinforcing self-purification of the web sites registered in the search engine.

It is yet another object of the present invention to provide a method for managing web sites registered in a search engine, in which an algorithm is used to automatically detect deceptive sites and automatically take punitive measures such as warning against the detected sites, thereby saving a large amount of human resources that may otherwise have been wasted to detect the deceptive sites.

According to a preferred embodiment of the present invention to provide a method for managing web sites registered in a search engine, said method comprising the steps of: receiving web site information of the registered web site, classifying the web site information by predetermined fields, and recording the classified web site information in a database; reading a source file constituting a web page of the registered web site; analyzing the read source file; determining, based on a predetermined basis, whether or not the registered web site is a deceptive site; and performing a control operation to perform predetermined processing on the registered web site if the web site is determined to be a deceptive site, wherein the source file is an HTML (Hypertext Markup Language) document.

In addition, according to a preferred embodiment of the present invention to provide a system for managing a web site registered in a search engine, the system comprising: an interface module for performing data communication with at least one terminal; a web site registration module for receiving a web site registration request including web site information of a predetermined web site from said at least one terminal and classifying the web site information by predetermined fields; a database for classifying and storing a predetermined keyword corresponding to the web site and the web site information; a web site analysis module for extracting a source file constituting a web page of the web site, and analyzing the extracted source file; and a web site management module for determining, based on a predetermined basis, whether or not the web site is a deceptive site.

As described above, the term "deceptive site" used in the present specification refers to a web site that inserts predetermined keywords in a source file of its web page in various ways and contains contents entirely different from those to be searched for based on the predetermined keywords. According to an embodiment of the present invention, the predetermined keywords inserted in the source file of the web page may be popular keywords.

The term "popular keywords" refers to search words that appear very frequently, among search words entered by Internet users. The popular keywords may continually vary depending on the Internet users' tendency and social situations of the time. The popular keywords may include harmful keywords containing socially harmful content, and some examples thereof are "suicide", "reject", "gambling" and "conspiracy".

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

A method for managing web sites registered in a search engine according to preferred embodiments of the present invention will now be described in detail with reference to the accompanying drawings.

Figure 2:
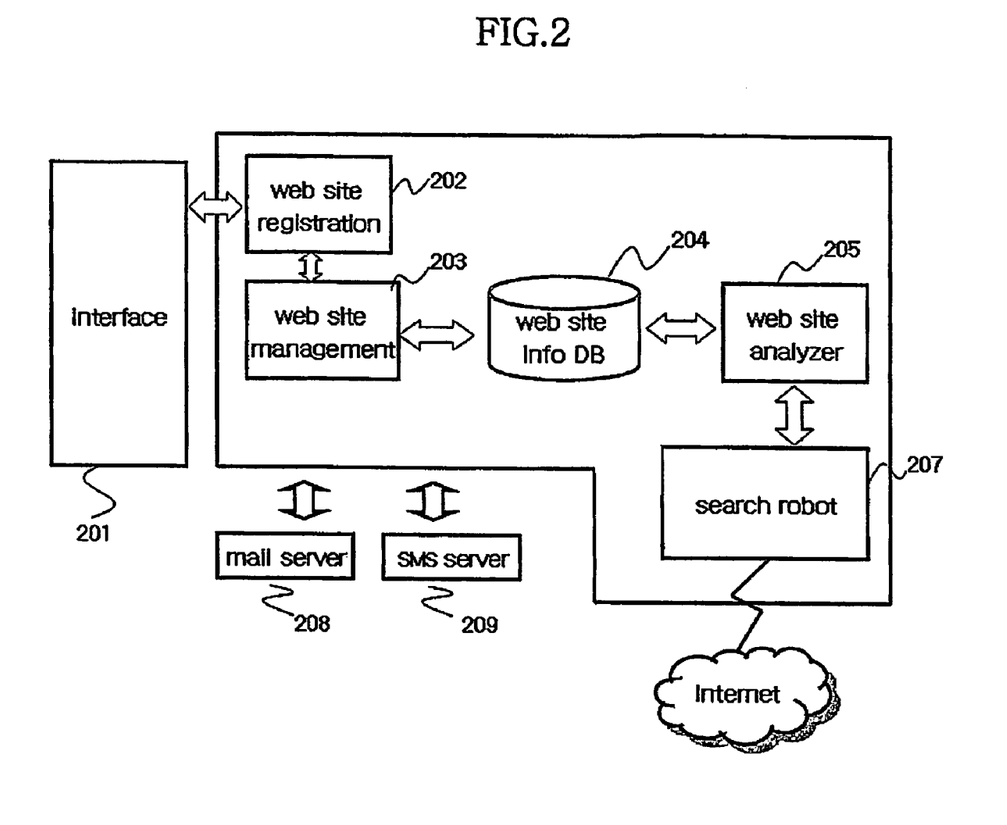
FIG. 2 is a block diagram showing the configuration of a system for managing web sites registered in a search engine according to a preferred embodiment of the present invention.

FIG. 2 is a block diagram showing the configuration of a system for managing web sites registered in a search engine according to an embodiment of the present invention. As shown in FIG. 2, the system according to the embodiment of the present invention includes an interface module 201, a web site registration module 202, a web site management module 203, a web site information database 204, a web site analysis module 205 and a search robot 207. According to the embodiment of the present invention, the system for managing web sites registered in the search engine may include a mail server 208 or an SMS server 209 for sending a predetermined message to a registrant of a registered web site. The mail server 208 and the SMS server 209 may be provided in a system for providing search engine services or may be located in a system operated by a third party. The interface module 201, other various modules, and the mail server 208 or the SMS server 209 are illustrated in FIG. 2 as separate entities. This illustration has been made only for easier explanation, and they may be the same entity. The elements shown in FIG. 2 may also be physically located at the same place, or alternatively they may be physically located apart from each other according to another embodiment of the present invention.

First, the interface module 201 functions to support data transmission between the search engine registration management system and a computer terminal provided to a registrant who desires to register a predetermined web site in the search engine, and also functions to interface between physical transmission equipment.

The web site registration module 202 functions to receive a request to register the predetermined web site from the registrant, and also to collect and classify information/data about the web site contained in the web site registration request. The web site registration module 202 may further include a billing module (not shown) for charging predetermined fees for the web site registration. The billing module may operate to charge different fees for a web site desired to be registered, depending on the type of the web site (i.e., depending on whether it is a general site containing general content or an adult site containing adult content).

The web site management module 203 is a module for overall registration management of web sites according to the present invention. Based on information of the web sites collected by the search robot 207, the web site management module 203 determines whether the web sites are in operation in conformity with a standard based on which their registration has been permitted. If it is determined that the web site is in inappropriate operation (i.e., it is a deceptive site), the web site management module 203 automatically takes a predetermined measure against a registrant of the web site. The web site management module 203 can interwork with the mail server 208 or the SMS server 209 to send an email to the registrant of the deceptive site or to send an SMS message to a mobile terminal of the registrant, thereby giving warning against the registrant for the inappropriate operation of the deceptive site.

The web site information database 204 functions to classify and record information of the registered web sites. Various information, such as URLs, keywords, registrant information (registrant's name, address, email address, mobile terminal number, etc.), directory information, and the like of the web sites, may be classified by the information fields and stored in the web site information database 204.

Information of a web site stored in the web site information database 204 may be modified by a registrant of the web site and by a system manager. When content of a web site is changed, the web site information database 204 may automatically update information of the web site stored therein, based on analysis results (for example, based on a new keyword corresponding to a URL of the web site) of data collected by the search robot 207 even though a registrant of the web site does not directly modify the stored information of the web site.

The web site analysis module 205 functions to analyze information of web sites collected by the search robot 207. The type of data collected by the search robot 207 and a method for analyzing the collected data will be described below in detail with reference to FIG. 3.

The above elements of the system for managing web sites registered in the search engine according to the embodiment of the present invention are divided simply according to their functions for easier explanation, and the functional division of the elements has nothing to do with actual physical locations thereof. It is obvious to those skilled in the art that the above modules may be embodied not only as hardware but also as software using a specific code.

Figure 3:
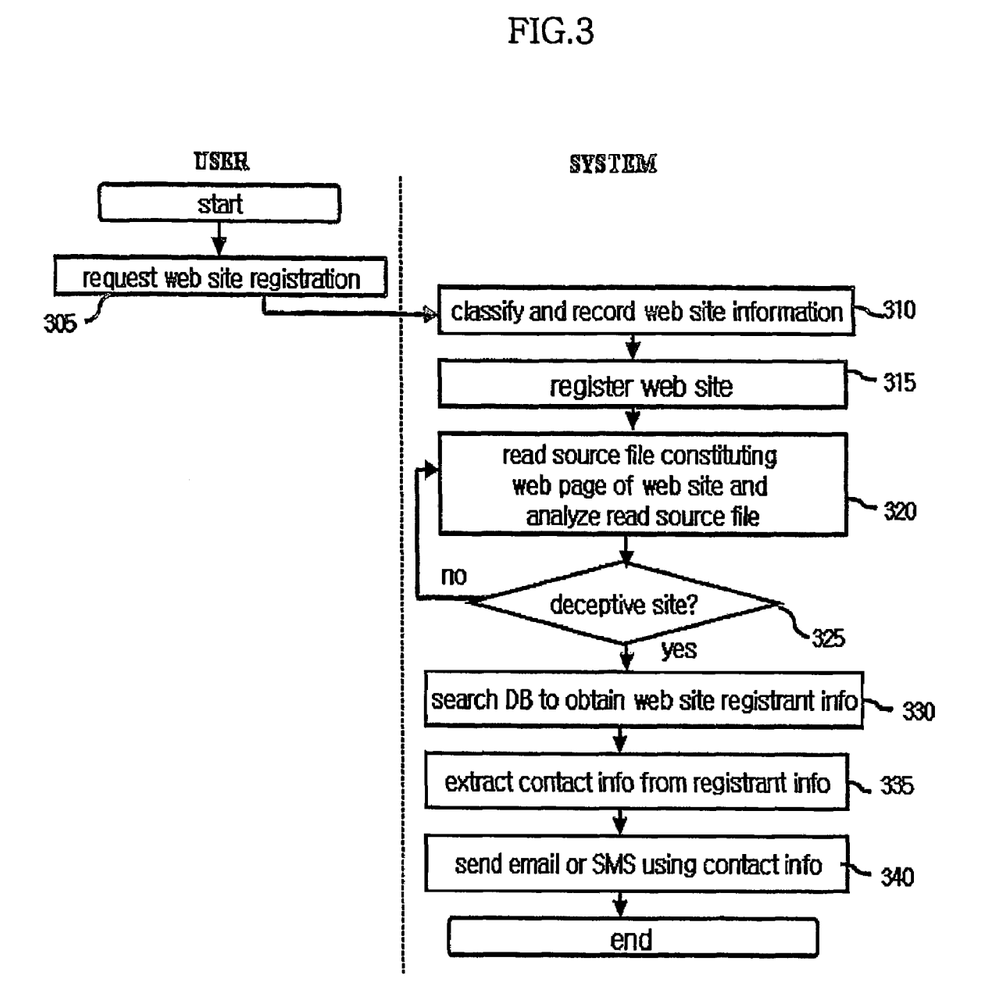
FIG. 3 is a flow chart showing a method for managing web sites registered in a search engine according to an embodiment of the present invention.

FIG. 3 is a flow chart showing a method for managing web sites registered in a search engine according to a preferred embodiment of the present invention. The method for managing the web sites registered in the search engine according to the preferred embodiment of the present invention will now be described in detail with reference to FIG. 3 in conjunction with FIGS. 4a to 4k and FIG. 6.

The web site registration management method according to the preferred embodiment of the present invention is performed in the following manner, as shown in FIG. 3. A registrant, who desires to register a predetermined web site in the search engine, makes a request to register the web site with information of the web site (305). The information of the web site is classified by information fields (registrant's name, address, email address, mobile phone number, etc.) and recorded in a web site information database (310), and the web site is registered in the search engine (315). This registration step 315 may be performed in several ways. For example, in one way, a web site is registered in the search engine upon request of a manager of the web site as described above. In another way, a web site is registered in the search engine based on information of the web site obtained by the search robot that randomly travels over the web. In the former case, the registrant (i.e., the manager) of the web site can request that the web site be registered in a category closest to a subject (for example, "Pikachu" and "patent bar exam") thereof decided by the registrant. After being reviewed by expert surfers, the requested web site can be registered in the search engine if it is determined that the requested web site satisfies predetermined requirements (for example, quality of the web site or noncommercial site requirements in case no registration fee is paid). The method for managing web sties registered in the search engine according to the present invention will be described, limited to the case where the web site is registered in the search engine upon request of the registrant of the web site. However, the method and system for managing web sties registered in the search engine according to the present invention can also be applied to other various ways in which the web site is registered in the search engine.

If the web site is registered, the search engine controls the search robot to read a source file constituting a web page of the registered web site and analyze the read source file (320).

According to the embodiment of the present invention, the source file analysis is based on HTML (Hypertext Markup Language) document analysis. In more detail, by analyzing tags in an HTML document of a web site, it can be determined whether the web site is a deceptive site that inserts popular keywords (i.e., high frequency search words) in an HTML document constituting its web site. As well known to those skilled in the art, the HTML document is composed of instructions called "tags", and a web designer or the like, who produces web pages, composes a web site using the tags, and includes content, which is desired to be provided via the web site, in the web site.

FIGS. 4a to 4k are diagrams illustrating various embodiments of a method for analyzing an HTML document of a web site at step 320 of FIG. 3a to determine whether the web site is a deceptive site that includes inappropriate character strings in tags contained in its HTML document. These figures illustrate various ways to detect whether a web site is a deceptive site, based on analysis of HTML document tags of the web site. A detailed description will now be given of how the HTML document analysis is performed in the method for managing web sites registered in the search engine according to the present invention, with reference to FIGS. 4a to 4k.

(1) Deceptive Site Using String of the Same Color as Background Color

Figure 4A:
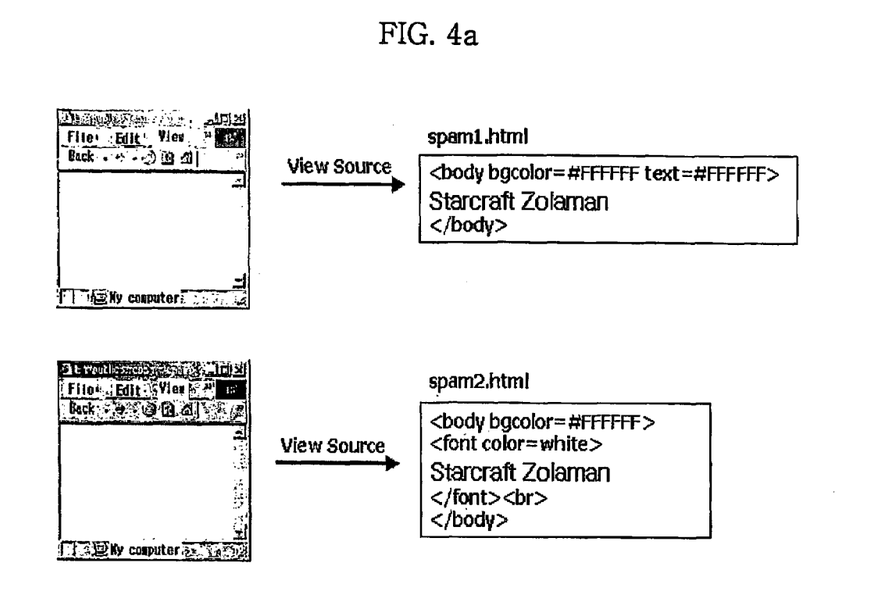
FIGS. 4a to 4k are various types of deceptive sites read by a search robot that travels over the web, in the method for managing web sites registered in the search engine according to a preferred embodiment of the present invention.

FIG. 4a is an example deceptive site that contains character strings enclosed by tags, which are the same color as the background color of the deceptive site. In this figure, the left images are screenshots of web sites displayed to users, and the right images are HTML source files of the web sites displayed on the left side. As shown in FIG. 4a, "#FFFFFF" is assigned to background color and "#FFFFFF" is also assigned to text color in the upper source file, so that text "Starcraft" and "Zolaman" are not viewed in the upper web site screen. In the same manner, "#FFFFFF" indicating white is assigned to background color and "white" is also assigned to text color in the lower source file of FIG. 4a, so that text "Starcraft" and "Zolaman" are not viewed in the lower web site screen. As well known to those skilled in the art, the tag <body> shown in the source files of FIG. 4a allows setting of various attributes of text or background displayed on a web page. Tags may be mainly classified into container tags composed of start and end tags (for example, <body></body> or <font></font> shown in FIG. 4a) and standalone tags that do not require end tags. These tags may be used to compose a web site in various ways. Accordingly, if the background color of a web site is the same as the character string color thereof as described above, the web site can be displayed on a search results screen with the help of predetermined popular keywords even though it contains content unrelated to the popular keywords.

(2) Deceptive Site Using String Contained in Redirection Page

Figure 4B:
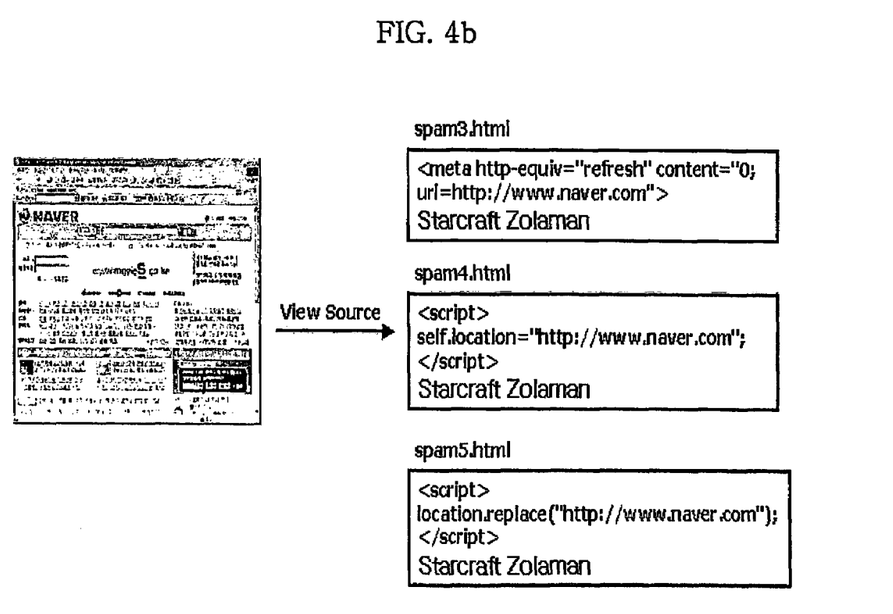

FIG. 4b is a diagram showing an example deceptive site using character strings contained in a redirection page. In this figure, the left image is a screenshot of a web site displayed to users, and the right images are HTML source files of the web site displayed on the left side. As well known to those skilled in the art, the redirection setting allows movement from a connected web site to a new web site, and it can be embodied in source files as shown on the right side of FIG. 4b. In FIG. 4b, the upper source file uses an http-equiv attribute in the meta tag. The meta tag is generally used to set automatic redirection to a different web page within a predetermined time specified in a "content" item of FIG. 4b. Typically, if the address of a home page is changed, the meta tag is used to automatically redirect a user connecting to an old address of the home page to a new address thereof within a predetermined time after displaying the address change information. The middle and lower source files in FIG. 4b use "self.location" and "location.replace" tags, respectively, to redirect from the current web page to "http://www.naver.com".

In the example deceptive site shown in FIG. 4b that uses the redirection page, the upper source file including the meta tag inserts predetermined popular keywords "Starcraft" and "Zolaman" next to the redirection instruction, and the middle and lower source files insert the predetermined popular keywords "Starcraft" and "Zolaman" next to the tag </script>.

These redirection pages use the tags to instruct movement to different web sites and thus text added next to the tags plays no role. However, the search robot provides search results determined based on the frequency of occurrence of a specific character string in a web site, which may cause the subject of the web site to be determined differently from its original subject. Accordingly, if a redirection page contains character strings as described above, the web site can be displayed on a search results screen with the help of popular keywords even though it contains content unrelated to the popular keywords.

(3) Deceptive Site Using String in Title Tag

Figure 4C:
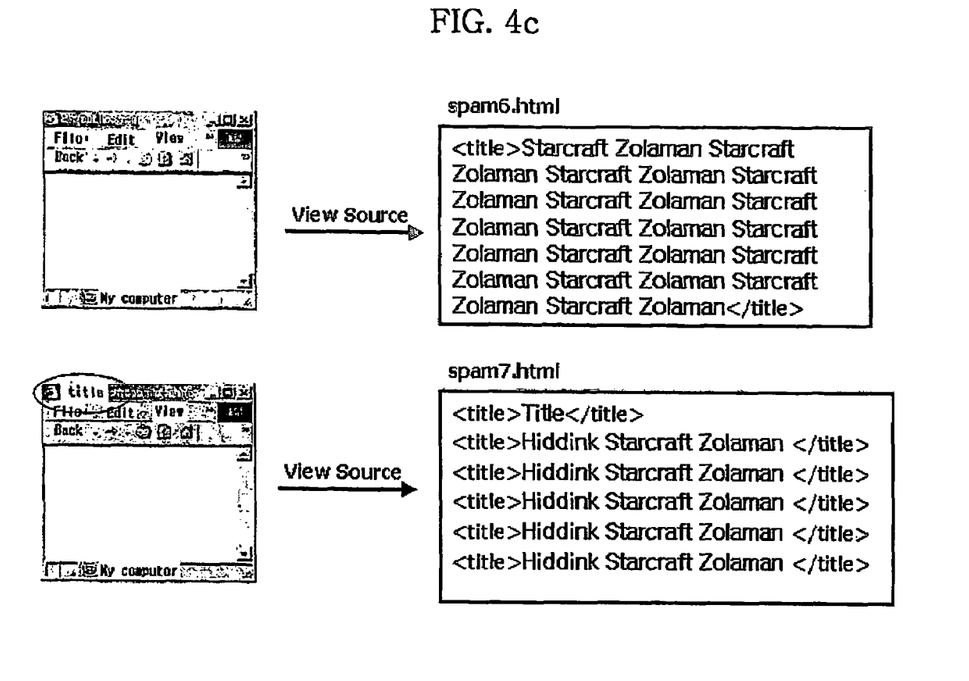

FIG. 4c is a diagram showing an example deceptive site using character strings contained in a title tag. In this figure, the left images are screenshots of web sites displayed to users, and the right images are HTML source files of the web sites displayed on the left side. As well known to those skilled in the art, the title tag is used to briefly display the subject of a web site on the top of a web browser, and it can be embodied in source files as shown on the right side of FIG. 4c. In FIG. 4c, the upper source file with a title tag, among the source files shown on the right side, includes a plurality of popular keywords such as "Starcraft" and "Zolaman" in the title tag, whereby a web browser is displayed as shown on the left side of FIG. 4c. On the other hand, the lower source file of FIG. 4c uses a plurality of title tags, where a plurality of popular keywords such as "Starcraft" and "Zolaman" are contained in their start and end tags <title> and </title>.

The content in these title tags is not displayed on the web browser no matter how long character strings the content contains. However, the search robot provides search results determined based on the frequency of occurrence of a specific character string in a web site, which may cause the subject of the web site to be determined differently from its original subject due to the character strings contained in the title tag. Accordingly, as described above, if the length of a character string included in the title tag is more than a predetermined numerical value, or if the number of title tags is more than one, the web site can be displayed on a search results screen with the help of popular keywords even though it contains content unrelated to the popular keywords.

(4) Deceptive Site Using String Contained in Meta Tag

Figure 4D:
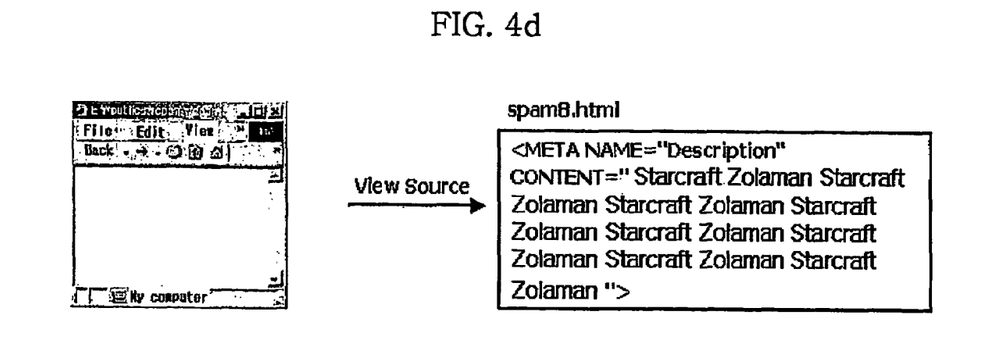

FIG. 4d is a diagram showing an example deceptive site using character strings contained in a meta tag. In this figure, the left image is a screenshot of a web site displayed to users, and the right image is an HTML source file of the web site displayed on the left side.

As well known to those skilled in the art, the meta tag is used to represent general information about an HTML document, such as an author, data of creation and keywords thereof, which is not displayed on the body of a web page corresponding to the HTML document. Referring to the source file on the right side of FIG. 4d, the meta tag contains "description" as document name and a plurality of popular keywords such as "Starcraft" and "Zolaman" as document content. The character strings, such as the popular keywords, contained in the meta tag are not displayed on the web page. However, the search robot provides search results determined based on the frequency of occurrence of a specific character string in a web site, which may cause the subject of the web site to be determined differently from its original subject. Accordingly, if a meta tag in a web site contains a character string, and the length of the character string is more than a predetermined numerical value as described above, the web site can be displayed on a search results screen with the help of popular keywords even though it contains content unrelated to the popular keywords.

(5) Deceptive Site Using String Located at Frame Tag

Figure 4E:
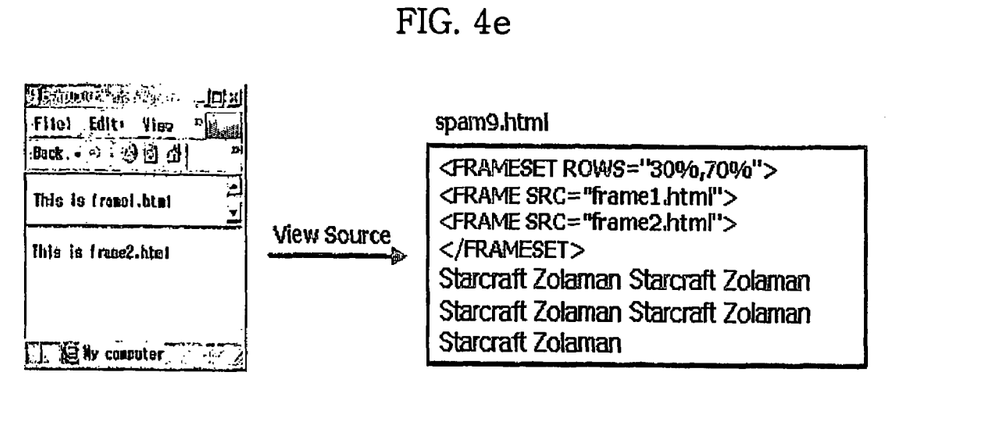

FIG. 4e is a diagram showing an example deceptive site using character strings located at a frame tag. In this figure, the left image is a screenshot of a web site displayed to users, and the right image is an HTML source file of the web site displayed on the left side. As well known to those skilled in the art, the frame tag is used to split a screen, on which a web page is displayed, into two or more frames. Referring to the source file on the right side of FIG. 4e, a frame tag <FRAMESET ROWS=" "> is used to split the screen horizontally, where information of the split screen ratio is inserted in " ". Character strings located next to the end tag </FRAMESET> of the frame tag include a plurality of popular keywords such as "Starcraft" and "Zolaman". The character strings, such as the popular keywords, located next to the end frame tag have nothing to do with the splitting of the web page screen. However, the search robot provides search results determined based on the frequency of occurrence of a specific character string in a web site, which may cause the subject of the web site to be determined differently from its original subject. Accordingly, if a character string is located at a frame tag, and the length of the character string is more than a predetermined numerical value as described above, the web site can be displayed on a search results screen with the help of popular keywords even though it contains content unrelated to the popular keywords.

(6) Deceptive Site Using String Contained in Form Tag

Figure 4F:
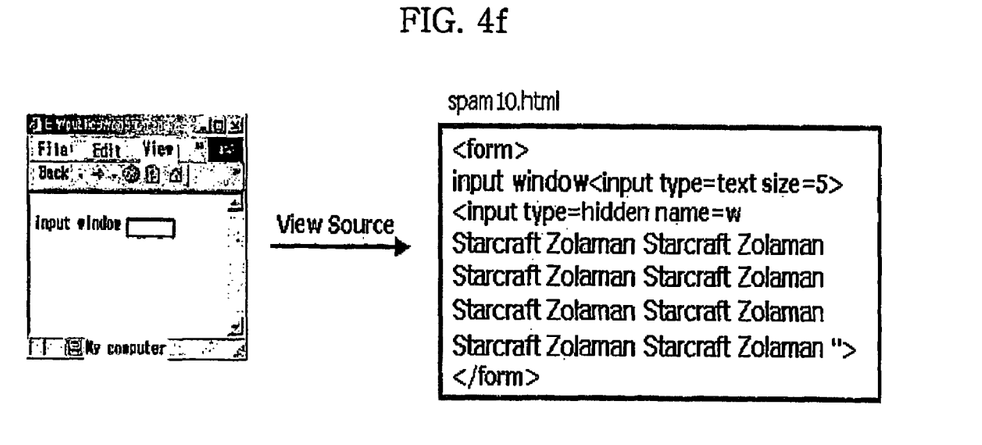

FIG. 4f is a diagram showing an example deceptive site using character strings contained in a form tag. In this figure, the left image is a screenshot of a web site displayed to users, and the right image is an HTML source file of the web site displayed on the left side. As well known to those skilled in the art, the form tag is used to define a desired form in a web page displayed with a web browser. Referring to the source file on the right side of FIG. 4f, the form tag may be composed as "<form><input type="button type" value="displayed text"></form>". The source file includes a button type "hidden" to set no text to be displayed on a corresponding button. Character strings shown in the source file, which are not displayed on the web page, include a plurality of popular keywords such as "Starcraft" and "Zolaman". The character strings, such as the popular keywords, contained in the form tag have nothing to do with the definition of a form in the web page. However, the search robot provides search results determined based on the frequency of occurrence of a specific character string in a web site, which may cause the subject of the web site to be determined differently from its original subject. Accordingly, if the length of a character string included in a form tag is more than a predetermined numerical value as described above, the web site can be displayed on a search results screen with the help of popular keywords even though it contains content unrelated to the popular keywords.

(7) Deceptive Site Using String Contained in Div Tag

Figure 4G:
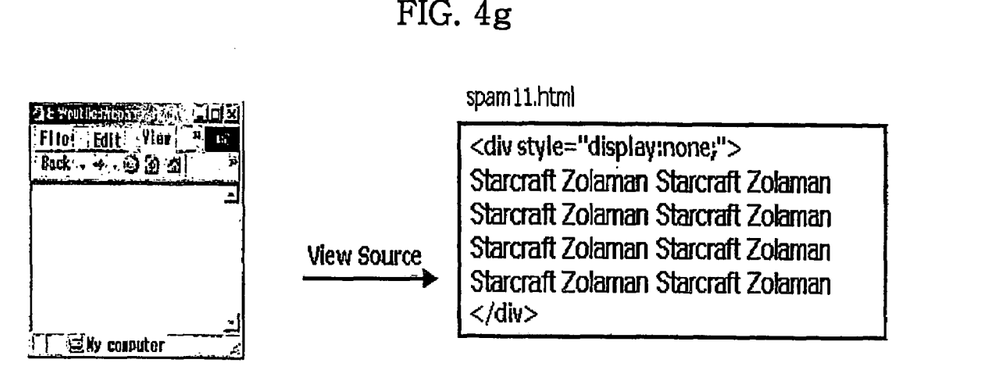

FIG. 4g is a diagram showing an example deceptive site using character strings contained in a div tag. In this figure, the left image is a screenshot of a web site displayed to users, and the right image is an HTML source file of the web site displayed on the left side. As well known to those skilled in the art, the div tag is used with a style sheet, using general ID and class attributes. In the source file on the right side of FIG. 4g, the div tag is described as "<div style="display: none; . . . >", where an attribute "style" defining a style of character strings to be displayed on a web page is set as "display:none", so that the character strings following the div tag are not displayed on the web page. The character strings, such as popular keywords, contained in the div tag have nothing to do with display of the web page on the screen. However, the search robot provides search results determined based on the frequency of occurrence of a specific character string in a web site, which may cause the subject of the web site to be determined differently from its original subject. Accordingly, if the length of a character string included in a div tag is more than a predetermined numerical value as described above, the web site can be displayed on a search results screen with the help of popular keywords even though it contains content unrelated to the popular keywords.

(8) Deceptive Site Using String Contained in a Href Tag

Figure 4H:
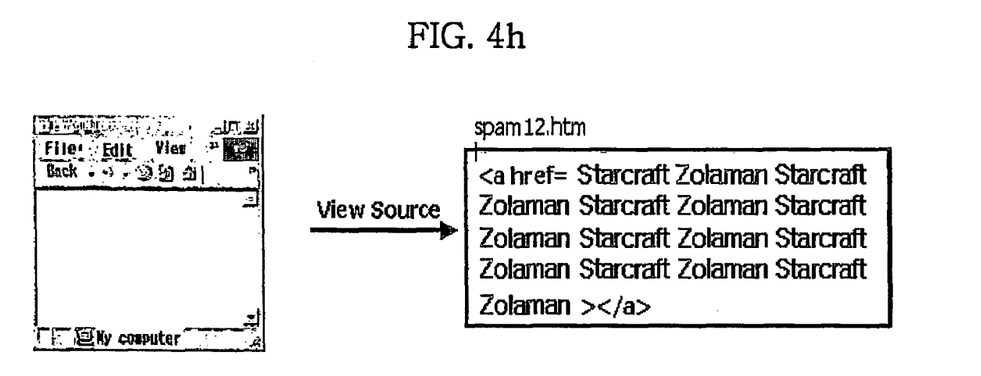

FIG. 4h is a diagram showing an example deceptive site using character strings contained in an "a href" tag. In this figure, the left image is a screenshot of a web site displayed to users, and the right image is an HTML source file of the web site displayed on the left side. As well known to those skilled in the art, the "a href" tag is used to link a specific word or image in a document to a location or address to move to, so as to facilitate movement to a different location in the same document or to a different document or web site. Referring to the source file on the right side of FIG. 4h, the a href tag may be composed of "<a href="a location or address to move to"> a link marking target</a>". Since no location to move to and no link marking target is assigned in the a href tag shown in FIG. 4h, the a href tag is not executed as well as content therein is not displayed on the web page. Character strings contained in the a href tag not to be executed include a plurality of popular keywords such as "Starcraft" and "Zolaman". The character strings, such as the popular keywords, contained in the href tag have nothing to do with linking or with display of the web page on the screen. However, the search robot provides search results determined based on the frequency of occurrence of a specific character string in a web site, which may cause the subject of the web site to be determined differently from its original subject. Accordingly, if the length of a character string included in an "a href" tag is more than a predetermined numerical value as described above, there is a risk that the web site may be displayed on a search results screen with the help of popular keywords even though it contains content unrelated to the popular keywords.

(9) Deceptive Site Using Link Farm

Figure 4I:
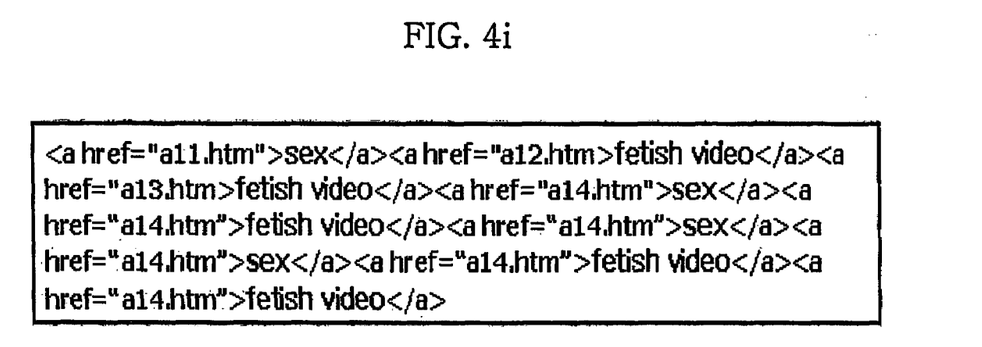

FIG. 4i is a diagram showing an example deceptive site using a link farm. As well known to those skilled in the art, the link farm is mostly used to increase the search engine ranking of a web page by generating a number of reciprocal links to the web site and thus causing the search engine to continually search for the web site. The link farm may be realized using the href tags described above.

There is a problem in directly determining the web site using the link farm to be a deceptive site. However, if a web site uses a link farm that includes an excessive number of links more than a predetermined number to cause the search engine to continually search for popular keywords in the web page, there is a need to detect the web site because it is highly likely to be a deceptive site.

(10) Deceptive Site Using String Contained in Font Tag

Figure 4J:
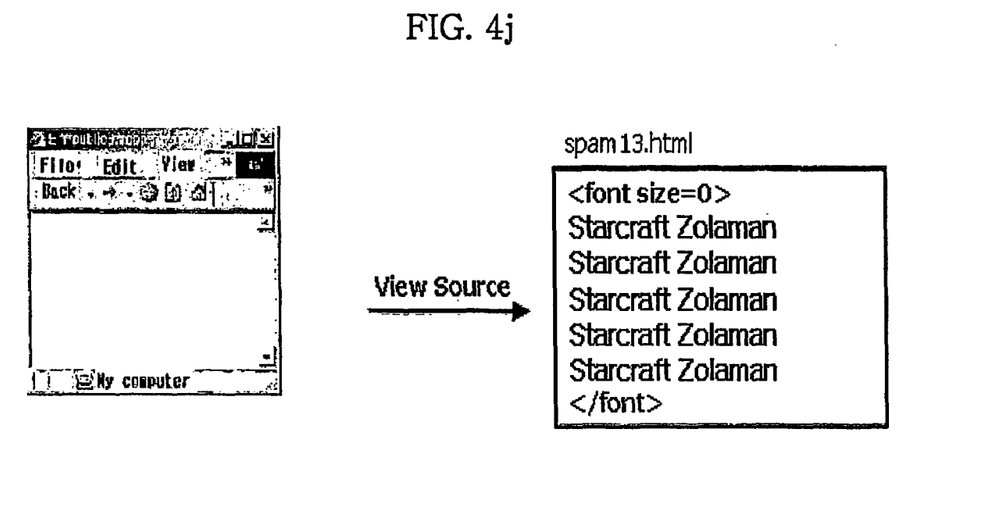

FIG. 4j is a diagram showing an example deceptive site using character strings contained in a font tag. In this figure, the left image is a screenshot of a web site displayed to users, and the right image is an HTML source file of the web site displayed on the left side.

As well known to those skilled in the art, the font tag is used to set the font size of character strings. In the source file shown in FIG. 4j, a font size is set to "0" in a font tag, so that character strings contained in the font tag are not displayed on the web page. In the case where the character strings, which are not displayed on a web page due to its font size "0", include a plurality of popular keywords such as "Starcraft" and "Zolaman", the character strings, such as the popular keywords, contained in the font tag have nothing to do with the display of the web page on the screen. However, the search robot provides search results determined based on the frequency of occurrence of a specific character string in a web site, which may cause the subject of the web site to be determined differently from its original subject. Accordingly, if a font tag in a web site contains character strings whose font size is zero as described above, the web site can be displayed on a search results screen with the help of popular keywords even though it contains content unrelated to the popular keywords.

(11) Deceptive Site Using String Contained in Image Tag

Figure 4K:
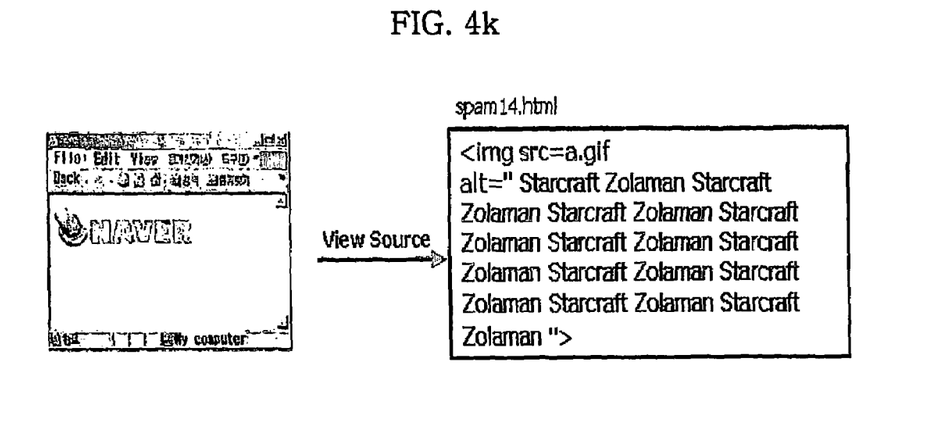

FIG. 4k is a diagram showing an example deceptive site using character strings contained in an img tag. In this figure, the left image is a screenshot of a web, site displayed to users, and the right image is an HTML source file of the web site displayed on the left side.

As well known to those skilled in the art, the img tag is used to insert a specific image in a document. In the source file shown in FIG. 4k, "a.gif" is assigned as an image file to be inserted. After assigning the image to be inserted, the img tag generally specifies an attribute such as a location or an alignment method of the image. In the case of FIG. 4k, such an attribute is specified using character strings. When the image is displayed on the web browser, the attribute specified using the character strings has no influence on the display of the image. In the case where the character strings having no influence on the attribute of the image include a plurality of popular keywords such as "Starcraft" and "Zolaman", the character strings, such as the popular keywords, contained in the img tag have nothing to do with the display on the web browser screen. However, the search robot provides search results determined based on the frequency of occurrence of a specific character string in a web site, which may cause the subject of the web site to be determined differently from its original subject. Accordingly, if the length of a character string included in an img tag is more than a predetermined numerical value as described above, the web site can be displayed on a search results screen with the help of popular keywords even though it contains content unrelated to the popular keywords.

At step 320 of FIG. 3, a tag or the like contained in an HTML document corresponding to a web site is analyzed, and the length of character strings contained in the tag or the like is measured as described in the above embodiments.

At step 325, according to a predetermined basis based on this measurement result, it is determined whether the web site is a deceptive site. For example, wherein the predetermined basis is whether or not the HTML document includes a character string of the same color as background color of the web page or wherein the predetermined basis is whether or not a redirection tag in the HTML document includes a character string.

Examples of the predetermined basis at step 325 to determine whether the web site is a deceptive site are as described above with reference to FIGS. 4a to 4k. For example, the predetermined basis may be whether or not the HTML document includes a character string of the same color as background color of the web page, or whether or not a redirection tag in the HTML document includes a character string.

According to a preferred embodiment of the present invention, a hybrid of the analyses described above in the deceptive site types (1) to (11) is used as the predetermined basis at step 325, and if the analysis value is more than a predetermined value, it is determined that the web site is a deceptive site. For example, if the number of title character strings contained in a title tag is more than one, 10 points may be added to the analysis value for each string, and up to 70 points may be added thereto. If a redirection page includes character strings, 70 points may be added to the analysis value irrespective of the number of the character strings. For a link farm, 4 points per 50 links, up to 80 points, may be added to the analysis value. If there are character strings whose font size is "0", 5 points per 100 bytes of the character strings, up to 70 points, may be added to the analysis value. A source file constituting a web page is analyzed in this manner, and if a total analysis value of a web site, calculated using points and weighted values obtained respectively based on the above various bases, is more than 100 points, the web site may be determined to be a deceptive site. If the deceptive site determination is based on only one basis (for example, a web site is determined to be a deceptive site since the number of character strings contained in a title tag of the web site is 50), the determination is highly likely to be erroneous. It is thus preferable that the deceptive site determination be made based on a combination of the various bases.

According to a preferred embodiment of the present invention, different predetermined bases for deceptive site determination may be applied to web sites registered in a robot-based search engine and web sites registered in a directory-based search engine. For example, if source file analysis of a web page corresponding to a web site registered in the robot-based search engine shows that the web site belongs to three of the 11 deceptive site types describe above, the web site is determined to be a deceptive site. On the other hand, a web site registered in the directory-based search engine is determined to be a deceptive site even if it belongs to only one of the 11 deceptive site types. This is because directory-based search engine providers, compared to robot-based search engine providers with web sites registered therein without registration fees, need to return favor to registrants of web sites since most of the directory-based search engine providers receive registration fees from the registrants.

If the web site is determined to be a deceptive site at step 325, the registrant field of the database described above is searched to obtain information of a registrant of the web site (330). Contact information of the registrant is extracted from the registrant information of the web site (335). Warning is given to the registrant of the web site by sending an email or an SMS message to the registrant using the extracted contact information (340). The warning will be described below in detail with reference to FIG. 5.

According to another embodiment of the present invention, an image described in a tag of a web site may be analyzed at step 320. For example, pixels of the image are analyzed to extract RGB components of the pixels, and if the number of pixels of a specific color (for example, yellow) of the extracted RGB components exceeds a predetermined reference value (for example, if the number of pixels is 50% or more), the web site may be considered a site containing obscene content, based on which it may be determined whether the web site is a deceptive site.

Figure 5:
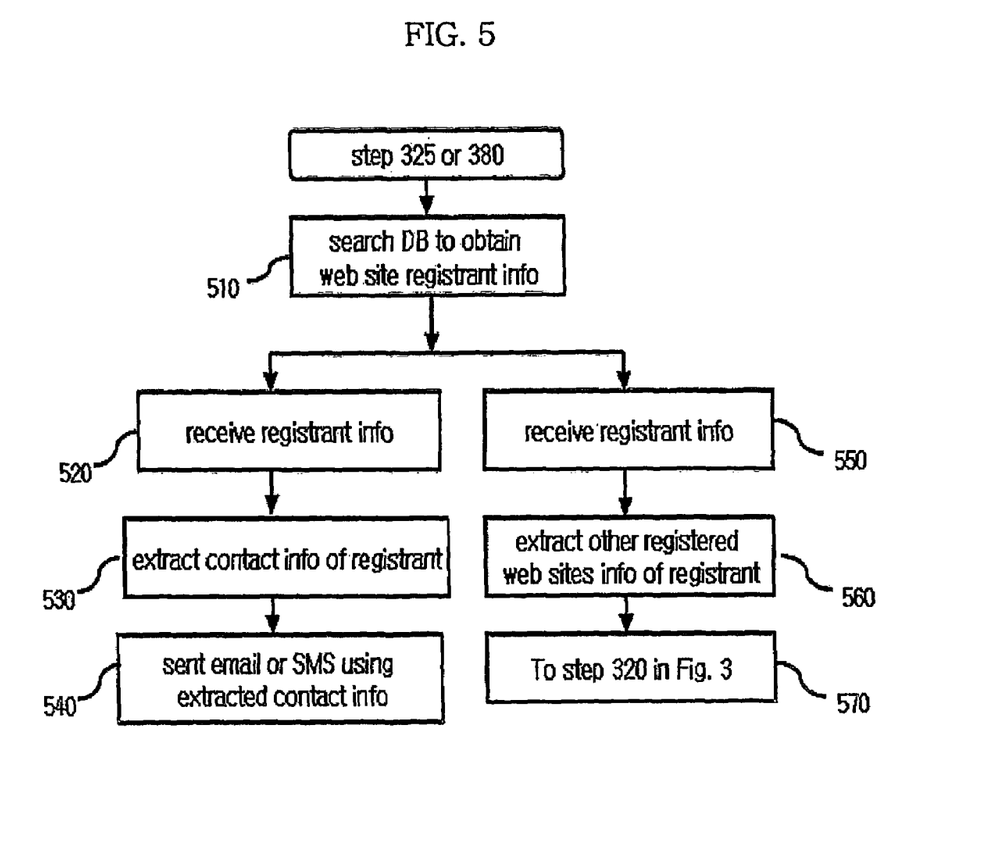
FIG. 5 is a flow chart showing a method for imposing a predetermined punitive measure on a registrant of a web site that is determined to be a deceptive site, in the method for managing the web sites registered in the search engine, according to a preferred embodiment of the present invention.

FIG. 5 is a flow chart showing a method for imposing a predetermined punitive measure on a registrant of a web site that is determined to be a deceptive site or an altered site, in the method for managing the web sites registered in the search engine, according to a preferred embodiment of the present invention.

With reference to FIG. 5, a description will now be given of how a punitive measure is automatically taken against a web site when it is determined to be a deceptive site at step 325 of FIG. 3. If the web site is determined to be a deceptive site, a web site management module searches a web site information database to obtain information of a registrant of the web site (510), and the web site management module receives the registrant information (520 and 550). According to an embodiment of the present invention, the web site management module extracts contact information of the registrant, such as an email address or a mobile terminal number thereof, from the received registrant information (530), and controls a mail server or an SMS server to transmit a predetermined message to a location corresponding to the contact information (540).

According to another embodiment of the present invention, the web site management module extracts information of other registered web sites of the registrant from the registrant information (560), and then performs a control operation to automatically analyze the other web sites registered under the same registrant name (570). This is because the other web sites registered under the same registrant name are highly likely to be deceptive sites operated based on the same or similar method. In this embodiment, if, based on the analysis of the other registered web sites, it is determined that they are deceptive sites, step 510 of FIG. 5 may be repeated.

According to a preferred embodiment of the present invention, if a web site is determined to be a deceptive site based on the analysis and determination methods, the system for managing the registered web sites may operate to automatically send an email, an SMS message or the like to a registrant of the web site to point out problems of the web site and then request that the registrant of the web site correct the problems within a grace period. In addition, the system may be set to automatically perform the analysis and determination processes after the grace period. If the problems of the web site have not been corrected even after the grace period, a punitive measure, such as cancel of the registration of the web site, may be taken against the registrant thereof. According to another embodiment of the present invention, a punitive measure such as a complicated registration procedure may be imposed on the registrant of the web site when the registrant requests registration of another web site at a later time.

Embodiments of the present invention further relate to computer readable media that include program instructions for performing various computer-implemented operations. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 6:
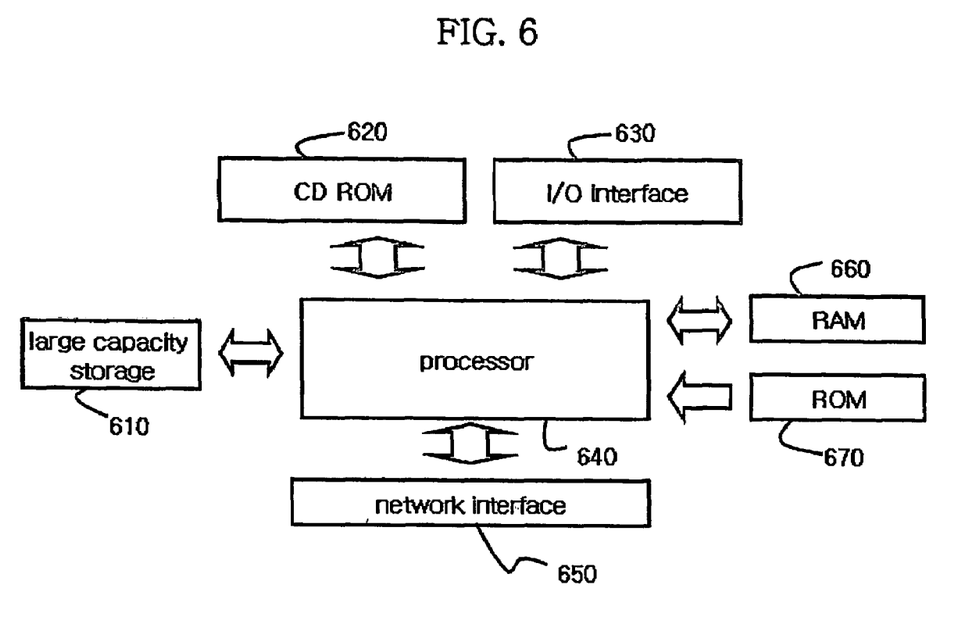
FIG. 6 is a block diagram showing the internal configuration of a general computer system that can be used in managing web pages registered in the search engine according to the present invention.

FIG. 6 is a block diagram showing the internal configuration of a general computer system that can be used in managing web pages registered in the search engine according to the present invention.

The computer system includes any number of processors 640 (also referred to as central processing units, or CPUs) that are coupled to storage devices including primary storage 660 (typically a random access memory, or "RAM"), primary storage 670 (typically a read only memory, or "ROM"). As is well known in the art, primary storage 660 acts to transfer data and instructions uni-directionally to the CPU and primary storage 660 is used typically to transfer data and instructions in a bi-directional manner. Both of these primary storage devices may include any suitable type of the computer-readable media described above. A mass storage device 610 is also coupled bi-directionally to CPU 640 and provides additional data storage capacity and may include any of the computer-readable media described above. The mass storage device 610 may be used to store programs, data and the like and is typically a secondary storage medium such as a hard disk that is slower than primary storage. A specific mass storage device such as a CD-ROM 620 may also pass data uni-directionally to the CPU. Processor 640 is also coupled to an interface 630 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 640 optionally may be coupled to a computer or telecommunications network using a network connection as shown generally at 650 With such a network connection, it is contemplated that the CPU might receive information from the network, or might output information to the network in the course of performing the above-described method steps. The above-described devices and materials will be familiar to those of skill in the computer hardware and software arts.

The hardware elements described above may be configured (usually temporarily) to act as one or more software modules for performing the operations of this invention.

INDUSTRIAL APPLICABILITY

According to a method for managing web sites registered in a search engine, in which an algorithm is used to automatically detect deceptive sites, thereby allowing users of the search engine to correctly search for their desired information.

According to a method for managing web sites registered in a search engine, in which deceptive sites are automatically detected, and punitive measures are automatically imposed on operators of the detected deceptive sites, thereby reinforcing self-purification of the web sites registered in the search engine.

According to a method for managing web sites registered in a search engine, in which an algorithm is used to automatically detect deceptive sites and automatically take punitive measures such as warning against the detected sites, thereby saving a large amount of human resources that may otherwise have been wasted to detect the deceptive sites.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A method for managing a web site registered in a search engine, said method comprising the steps of:
  receiving web site information of the registered web site, classifying the web site information by predetermined fields, and recording the classified web site information in a database;
  reading a source file constituting a web page of the registered web site;
  analyzing the read source file;
  determining, based on a predetermined basis, whether or not the registered web site is a deceptive site; and
  performing a control operation to perform predetermined processing on the registered web site if the web site is determined to be a deceptive site.

2. The method according to claim 1, wherein the source file is an HTML (Hypertext Markup Language) document.

3. The method according to claim 2, wherein the predetermined basis is whether or not the HTML document includes a character string of the same color as background color of the web page.

4. The method according to claim 2, wherein the predetermined basis is whether or not a redirection tag in the HTML document includes a character string.

5. The method according to claim 2, wherein the predetermined basis is whether or not the length of a title tag included in the HTML document is more than a predetermined numerical value or whether or not the number of title tags included therein is more than one.

6. The method according to claim 2, wherein the predetermined basis is whether or not the length of a character string in a meta tag included in the HTML document is more than a predetermined numerical value.

7. The method according to claim 2, wherein the predetermined basis is whether or not a character string exists in a frame tag in the HTML document.

8. The method according to claim 2, wherein the predetermined basis is whether or not the length of a character string included in a form tag in the HTML document is more than a predetermined numerical value.

9. The method according to claim 2, wherein the predetermined basis is whether or not the length of the same character strings in a div tag in the HTML document is more than a predetermined numerical value.

10. The method according to claim 2, wherein the predetermined basis is whether or not an a href tag in the HTML document includes a character string other than a URL (Universal Resource Locator).

11. The method according to claim 2, wherein the predetermined basis is whether or not the HTML document includes links which link web pages in the same web site, the number of said links being more than a predetermined number.

12. The method according to claim 2, wherein the predetermined basis is whether or not the HTML document includes a character string whose font size is zero.

13. The method according to claim 2, wherein the predetermined basis is whether or not the length of a character string included in an img tag in the HTML document is more than a predetermined numerical value.

14. The method according to claim 2, comprising at least two of the following predetermined bases: (a) whether or not the HTML document includes a character string of the same color as background color of the web page;
   (b) whether or not a redirection tag in the HTML document includes a character string;
   (c) whether or not the length of a title tag included in the HTML document is more than a predetermined numerical value or whether or not the number of title tags included therein is more than one;
   (d) whether or not the length of a character string in a meta tag included in the HTML document is more than a predetermined numerical value;
   (e) whether or not a character string exists in a frame tag in the HTML document;
   (f) whether or not the length of a character string included in a form tag in the HTML document is more than a predetermined numerical value;
   (g) whether or not the length of the same character strings in a div tag in the HTML document is more than a predetermined numerical value;
   (h) whether or not an a href tag in the HTML document includes a character string other than a URL (Universal Resource Locator);
   (i) whether or not the HTML document includes links which link web pages in the same web site, the number of said links being more than a predetermined number;
   (j) whether or not the HTML document includes a character string whose font size is zero; and (k) whether or not the length of a character string included in an img tag in the HTML document is more than a predetermined numerical value.

15. The method according to claim 14, said step of determining whether or not the registered web site is a deceptive site includes the steps of:
   maintaining predetermined weighted values corresponding respectively to the predetermined bases;
   calculating respective point values of the predetermined bases according to predetermined point calculation methods corresponding respectively to the predetermined bases;
   calculating respective intermediate values of the predetermined bases by multiplying the calculated point values respectively by the weighted values corresponding to the predetermined bases corresponding to the calculated point values;
   obtaining a sum of the calculated intermediate values of the predetermined bases; and
   determining whether or not the sum of the respective intermediate values is more than a predetermined value, and determining that the web site is a deceptive site if the sum is more than the predetermined value.

16. The method according to claim 2, wherein the predetermined basis is whether or not a combined color value of RGB components of pixels included in an image file contained in an img tag in the HTML document is more than a predetermined value.

17. The method according to claim 1, wherein the database includes a web site registrant field, and
   wherein said step of performing the control operation to perform the predetermined processing comprises the steps of:
   obtaining information of a registrant of the web site by searching the web site registrant field of the database;
   extracting contact information of the registrant from the registrant information of the web site; and
   transmitting a message to a location corresponding to the extracted contact information.

18. The method according to claim 17, wherein the contact information is a mobile terminal number or an email address of the registrant of the web site, and
   wherein said step of transmitting the message comprises the step of controlling an email server to send an email to the email address or the step of controlling an SMS server to send an SMS message to the mobile terminal number.

19. The method according to claim 1, wherein the database includes a web site registrant field, and
   wherein said step of performing the control operation to perform the predetermined processing comprises the steps of:
   obtaining information of a registrant of the web site by searching the web site registrant field of the database;
   extracting a URL of a different web site registered by the registrant from the registrant information of the web site; and
   reading a source file constituting a web page of a web site connected through the URL;
   analyzing the read source file;
   determining, based on a predetermined basis, whether or not the web site is a deceptive site; and performing a control operation to perform predetermined processing on the registered web site if the web site is determined to be a deceptive site.

20. A computer-readable recording medium in which a program for performing the method defined in any one of claims 1 to 19 is recorded.

21. A system for managing a web site registered in a search engine, the system comprising:

an interface module for performing data communication with at least one terminal;

a web site registration module for receiving a web site registration request including web site information of a predetermined web site from said at least one terminal and classifying the web site information by predetermined fields;

a database for classifying and storing a predetermined keyword corresponding to the web site and the web site information;

a web site analysis module for extracting a source file constituting a web page of the web site, and analyzing the extracted source file; and a web site management module for determining, based on a predetermined basis, whether or not the web site is a deceptive site.

* * * * *